United States Patent [19]

Brown

[11] 4,229,121

[45] Oct. 21, 1980

[54] CONCRETE REMOVAL APPARATUS

[75] Inventor: Lee O. Brown, Houston, Tex.

[73] Assignee: The Sea Horse Corporation, Houston, Tex.

[21] Appl. No.: 852,244

[22] Filed: Nov. 17, 1977

[51] Int. Cl.² ............................................. F16L 1/00
[52] U.S. Cl. ............................... 405/158; 15/104.04; 405/154
[58] Field of Search .............. 61/72.4, 110, 111, 105, 61/69 R; 134/167 C, 168 C, 166 C, 134; 165/104.04, 88

[56]  References Cited
U.S. PATENT DOCUMENTS

| 293,011 | 2/1884 | Hall et al. ............................. 15/88 X |
| 2,823,398 | 2/1958 | Curran ................................. 15/104.04 |
| 3,820,184 | 6/1974 | Stone ................................... 15/104.04 |
| 3,933,519 | 1/1976 | Koch et al. ............................. 134/34 |
| 4,028,903 | 6/1977 | Dietrich ................................. 405/170 |

FOREIGN PATENT DOCUMENTS 1372743  8/1964  France ....................................... 61/72.4

Primary Examiner—Dennis L. Taylor
Attorney, Agent, or Firm—Kenneth H. Johnson

[57]  ABSTRACT

A tool is provided for removing concrete from underwater pipes which tool is comprised of a frame or member having two coaxially opposed concrete removal jets mounted thereon, whereby the opposing forces of the two jets cancel out the thrusting effect of one against the other to thereby provide a device which does not require massive rigid equipment to hold the jets or nozzles in place adjacent the pipe.

2 Claims, 42 Drawing Figures

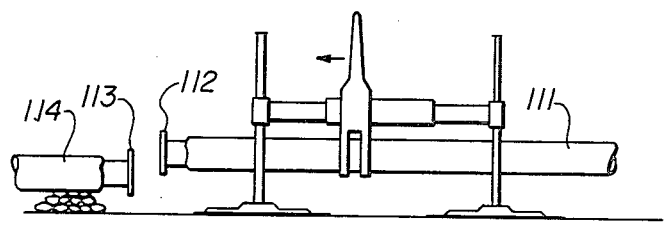
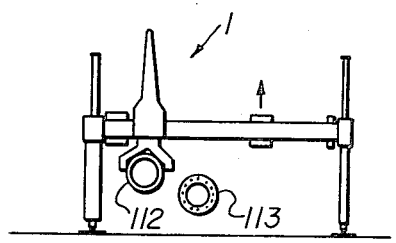
FIG. 19     FIG. 20
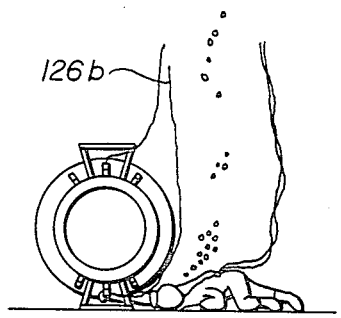
FIG. 26
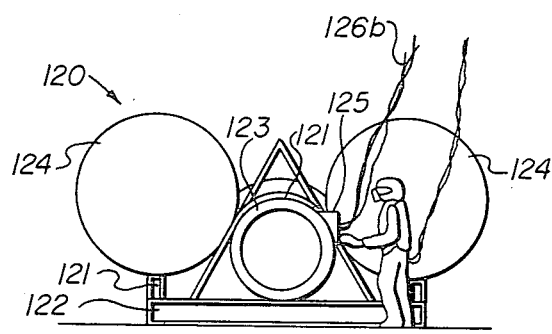
FIG. 27
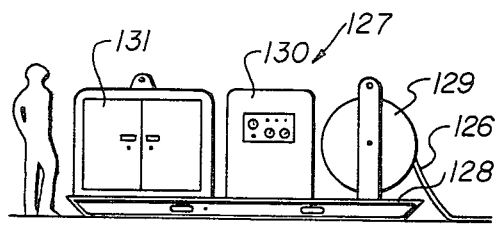
FIG. 28

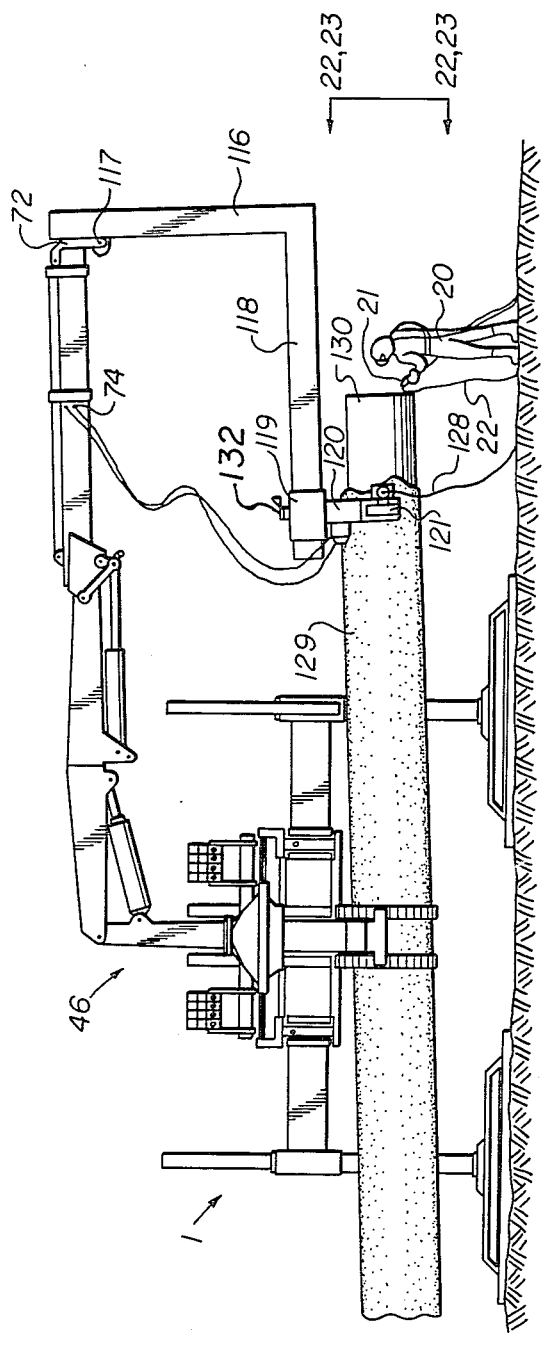
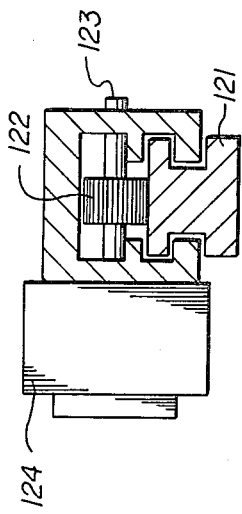
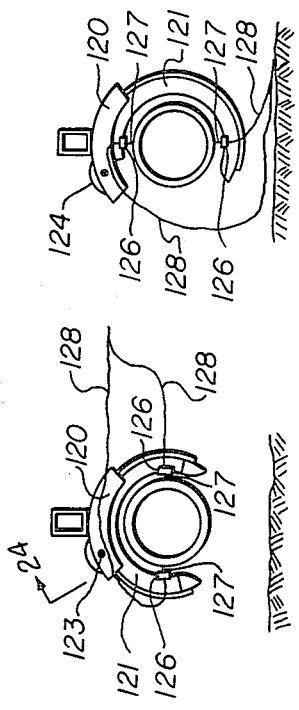
FIG. 21
FIG. 24
FIG. 23
FIG. 22

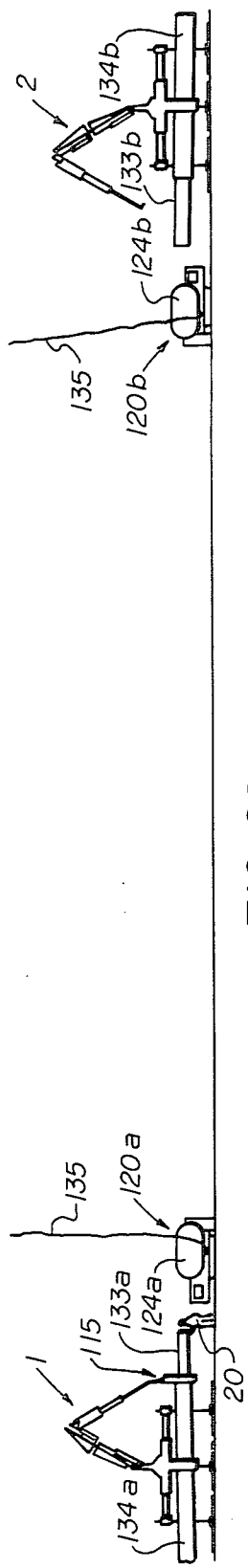
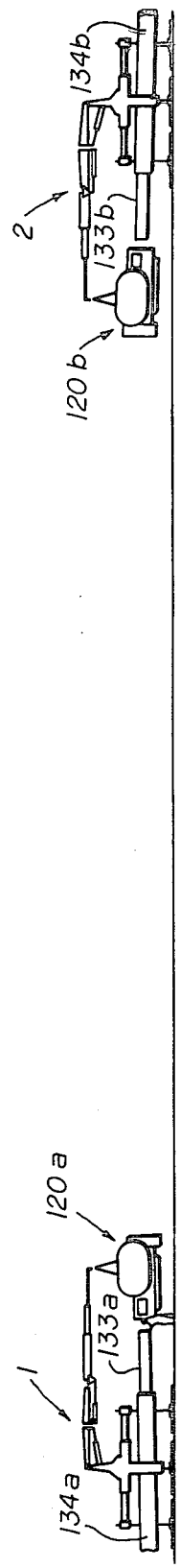
FIG. 29
FIG. 30

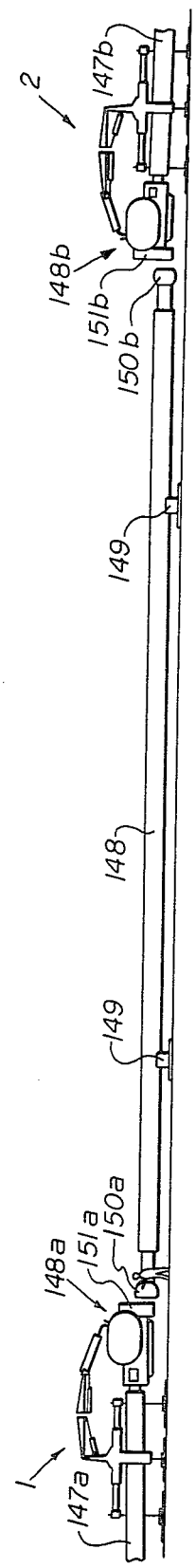
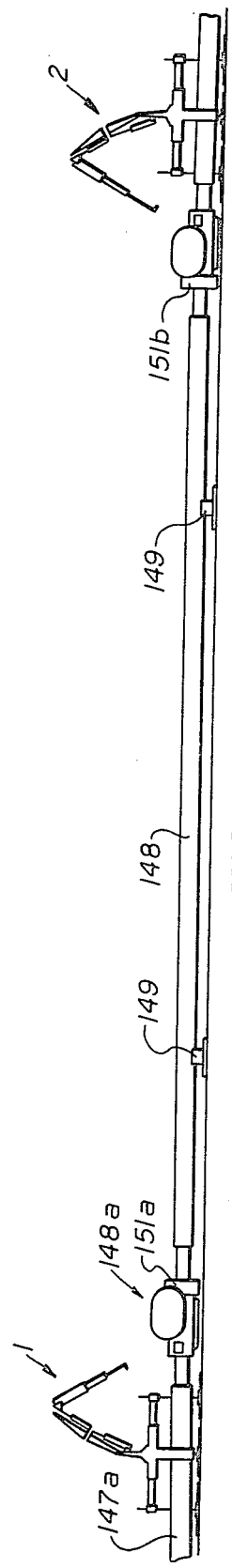
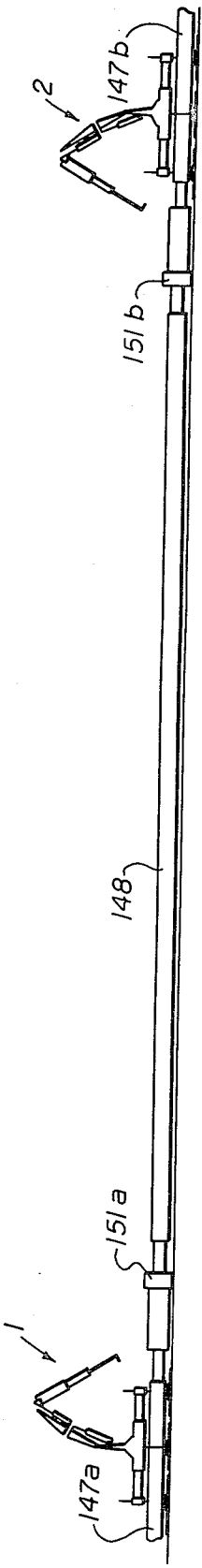
FIG. 37
FIG. 38
FIG. 39

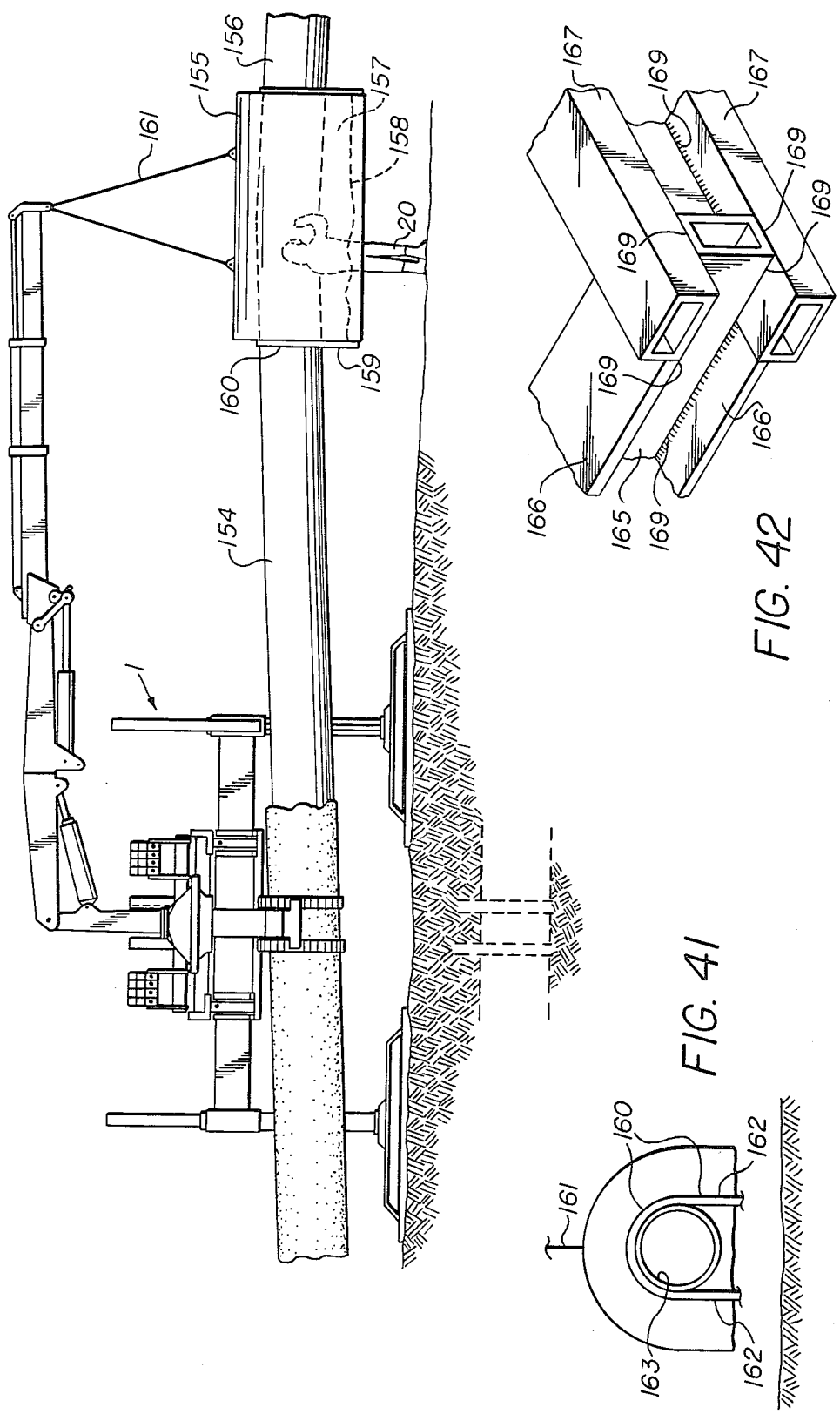

CONCRETE REMOVAL APPARATUS

FIELD OF ART

This invention relates to cranes and to submarine construction and material handling work, which at the present is mostly related to offshore petroleum production and transportation. The embodiment shown applies largely to petroleum pipeline connection and repair, to pipe and equipment handling, preparation, and installation.

More generally, the invention applies to diver or remote-controlled submarine construction and materials and equipment handling.

THE PRIOR ART

The offshore market is in a huge and growing boom. There is a fleet of 2500 work boats at $0.8 to $4.0 million each. There are about 300 marine construction contractors. Anywhere there is offshore production there will be underwater construction. There are about 100 diving contractors working mostly in offshore oil fields, with over 1000 divers. Much of the commercial diving now being done is related to offshore pipelines. A large percentage of this work involves moving pipes around.

Typical jobs which require moving heavy pipes are pipeline repairs, connecting the ends of two pipelines, installation of valves, repair of valves, tapping into existing lines, connecting pipelines to manifolds, subsea well heads, and platforms, and a number of other jobs.

The cost of this type of work is high. A barge in the North Sea costs over $100,000 a day when diving facilities, tugs, supply boats and support costs are included. When diving work is being done, the entire barge with a 50 to 250 man crew is often being paid for while the only productive work is that of one or two divers. An underwater pipeline tie-in will take from two days to three weeks, and in deep water it is done by divers. In the North Sea, the cost is multiplied by the fact that less than 35% of barge time is working time, even in the summer and if the barge works through the winter, which many do, the working time will be less than 20% for the year. Assuming the barge costs $100,000 a day and 25% working time, average, one day saved is worth $400,000. Every offshore platform has pipelines connected to it and in the North Sea the cost of connecting a riser (a pipe from a platform down to the marine floor) to a pipeline can be several million dollars. This is a very visible problem to the oil companies, and they are actively looking for ways to reduce the cost.

There are several basic methods now in use to connect underwater pipelines. Most of them could use an underwater crane.

The "Hard Flange", the oldest and one of the commonest methods of connecting pipelines, is to provide flanges on the ends of the lines to be connected, to measure the gap between the flanged ends, and to fabricate, on shipboard, a flanged spool piece to fit the gap. Sometimes the line is laid with a flanged end, and sometimes the lines are picked up by a barge crane to add the flanges. In deep water, this poses the danger of buckling the pipe, so the method becomes inapplicable.

The problem is to get the spool piece to fit. It is difficult to hold the flanged ends steady above the mud for measurement of the gap and for making a clean connection. Any contractor using this method would welcome an improved underwater handling device.

Four manufacturers now offer adjustable mechanical connectors, and others are just entering the market. They have various purposes, including elimination of the need to lift pipes out of the water to add flanges, and elimination of the need for accurate measurement.

HydroTech Systems makes a coupling they call a Hydrocouple which slips over the end of a pipeline and will mechanically connect to and seal on the line. It allows axial adjustment and angular misalignment of the pipe ends. It will connect underwater to a bare pipe end. This makes it very useful for pipeline repairs where a section has to be cut out of the pipeline. The job of repairing buried pipelines presents serious problems. In "conventional" repair, the damaged section is cut out, and the pipeline ends are raised to the surface to weld a section in. In deeper water, the section cannot be welded in because of the change in the length of the gap. In intermediate depths, the pipes are raised and the "hard flange" method is used. If the pipeline is buried, it must be dug up far enough back that the line can be lifted to the surface. In many cases, it has been cheaper to lay a new line.

Several companies have developed underwater welding techniques to solve the problem of pipeline repairs. The previous cost of doing repairs up to that time was enormous and warranted expensive equipment. What evolved were giant pipe alignment frames to hold and bend the pipes, and a welding habitat which is lowered into the alignment frame at the connection point. The welding habitat its on the pipes and the water is pumped out through its open bottom. The welders then enter the air-filled habitat and make a weld in the dry.

This Prior Art method and equipment is very expensive, complicated; it is perhaps warranted for pipeline repairs. The pipeline connections which have been done this way have been very expensive. A test weld on a 24 inch line was done in the Gulf of Mexico in 300 feet of water. It took three weeks and the cost in the North Sea will be as much as $400,000 per day. The oil companies are, of course, looking for alternate solutions.

Most of the methods just described are executed by divers, and they all require divers when things go wrong. With this in mind, it is astounding how poorly equipped divers are. Their common tools are an adjustable wrench, a prybar and a few come-alongs (ratchet hoists). Often a frame similar to an automobile mechanics engine gantry will be built on the barge deck with a hand chain hoist for lifting light loads. These are known in the art as "swing sets".

Consider the diver's problem. He is working off of a boat or barge which has a crane and winches on board and he is trying to move a heavy object in a current. The boat is moving and the length of the crane boom amplifies this movement. Six feet vertical oscillation of the boom is not uncommon. The diver is communicating to a dive station which in turn relays signals to the crane operator. It is easy to image the difficulties and danger.

Until a few years ago, underwater pipeline work was all done with equipment which was developed for other jobs. This resulted in difficulties that easily could have been avoided. It made very expensive equipment feasible.

More recently, underwater handling frames have been developed for lifting pipe ends and moving them sideways. Most such equipment has been very narrow in purpose, large, requiring much deck space, not smooth in actions, not controlled by the diver, not readily shipped by truck or any other means. It has all proved very valuable, however, since a spread of such equipment often costs much less than a tenth as much as the equipment it replaces, and may cost only 1 percent as much as the jobs done.

However, only two such devices have been made, by The Sea Horse Corporation of Houston, Texas, which have any claim to general-purposeness, and this disclosure presents an advance past these, both in versatility and in specific capabilities.

SUMMARY OF THE INVENTION

The present invention overcomes the difficulties of the prior art by placing the load support on the bottom, and by giving complete control of the load and appurtenances directly to whomever is in primary control of the task, and as follows.

The invention contemplates and offers the following provisions, features, and objects:

1. bottom support of loads, for stability, safety, and control,
2. three-legged support of a crane, for freedom from instability and uncertainty,
3. modular articulated footings, for freedom from instability and stress of uncertain support,
4. walking means for transportation of loads,
5. rolling footing means for transportation of loads,
6. variable speed lift and locking means for holding loads still, and for controlled motion,
7. selectable locking lift leg means for controlling the attitude of loads,
8. centricity of support in crane outriggers, for liberation of stresses,
9. bridge runway means supported on a movable gantry, the runway giving precise, close motions, movability being for walking or rolling over large distances,
10. bridge runway means with lift means for carrying pipe and other loads in three (3) dimensions, as for carrying a spool piece precisely into an opening between pipeline ends,
11. crane pairing and control means for tandem operation and one-point control of cranes connected by a load and separated by a distance, and for motion of a load in three (3) dimensions of translation and in controlled rotation,
12. a bridge crane with a trolley having a boom thereon, for motion or fixing of a load relative to the environment, and for motion of apparatus relative to the load,
13. a telescoping boom with pipe alignment means for carrying a connection or repairing apparatus along the pipe by telescoping,
14. opposed water jet holders for opposing two jets so that both remove concrete from a pipe,
15. boom means for manipulating water jets for concrete removal,
16. rotary powered water jet apparatus for carrying water jets along a pipe for concrete removal,
17. buoying and manifolding for speeding up the setting of pipeline connectors,
18. telescoping boom apparatus for guiding fittings onto a pipe, saving time and preventing injury,
19. tubular framework assembly offering great strength, safety, assembly, and corrosion advantages,
20. methods comprising a series of steps for saving time and improving the results in pipeline connector installations,
21. buoyancy/ballast equipment for spool piece placement,
22. spool piece placement method for avoiding equipment moves,
23. spool piece pillowing means for moving spool pieces longitudinally or holding them still above the bottom,
24. and many others to appear in the following.

BRIEF DESCRIPTION OF THE DRAWINGS

FIGS. 9 through 20 are schematic views showing walking of the crane according to the invention.

FIG. 21 is a general section view through the crane at work showing concrete removal equipment of the invention.

FIGS. 22, 23, and 24 are details of the above.

FIG. 26 is a drawing showing PRIOR ART.

FIGS. 27 and 28 show the improved apparatus for placing Hydrocouples. FIG. 27 is on-bottom equipment, and FIG. 28 is deck equipment.

FIGS. 29 and 30 show initial steps for utilizing the apparatus of the invention to make a mid-line tie-in or repair. Such steps as appear in FIGS. 29 and 30 are common to three (3) procedures shown following.

FIGS. 37, 38, and 39 show a third such procedure.

FIG. 40 is a cross-section through crane 1 at work on another type of Work.

FIG. 41 is an end view of the habitat shown in FIG. 40.

FIG. 42 shows, in perspective, a detail of an advanced embodiment of tubular froming of the invention.

DESCRIPTION OF PREFERRED EMBODIMENTS

Figure 1:
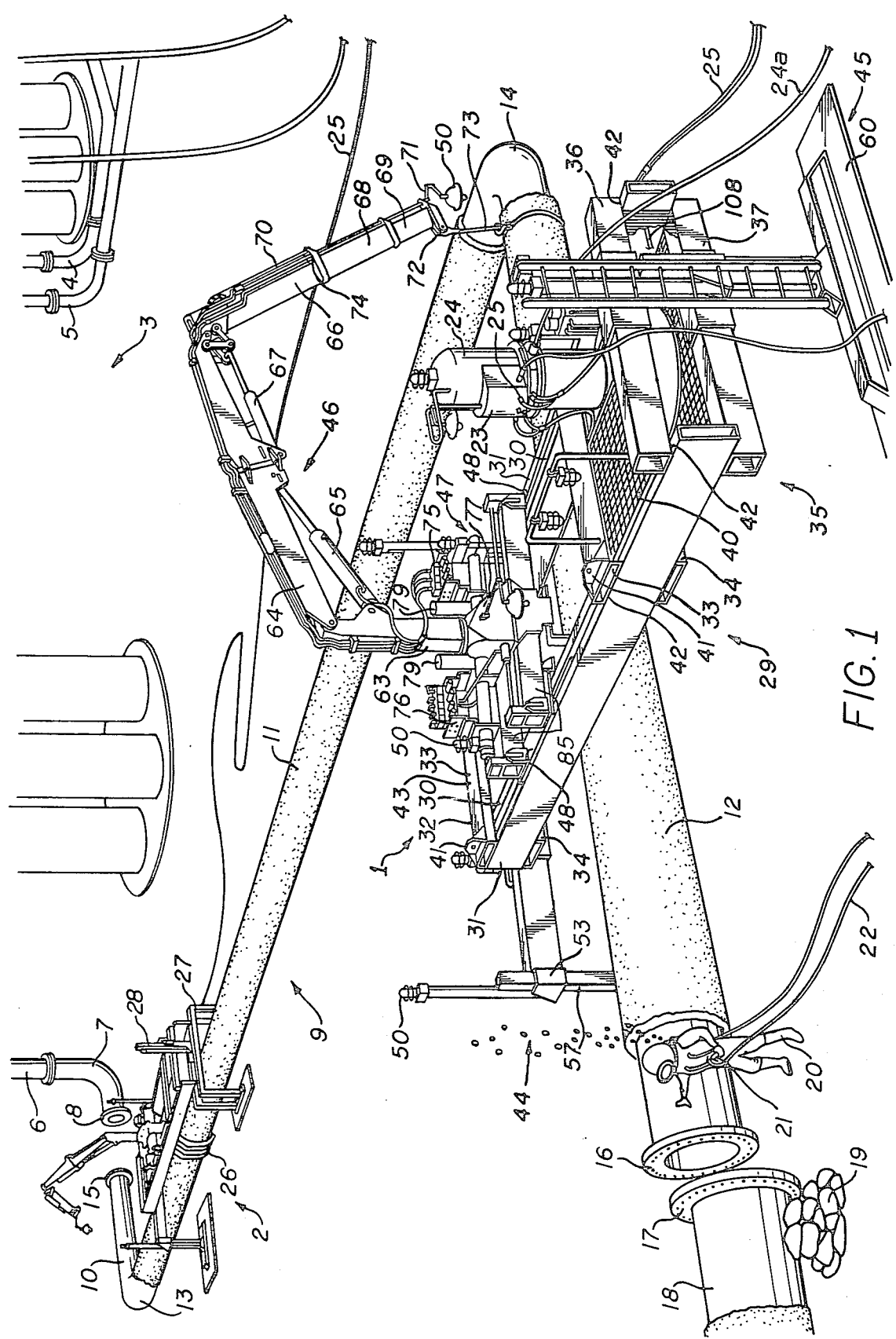
FIG. 1 is a perspective view of the placement of a large spool piece using the invention.
Figure 2:
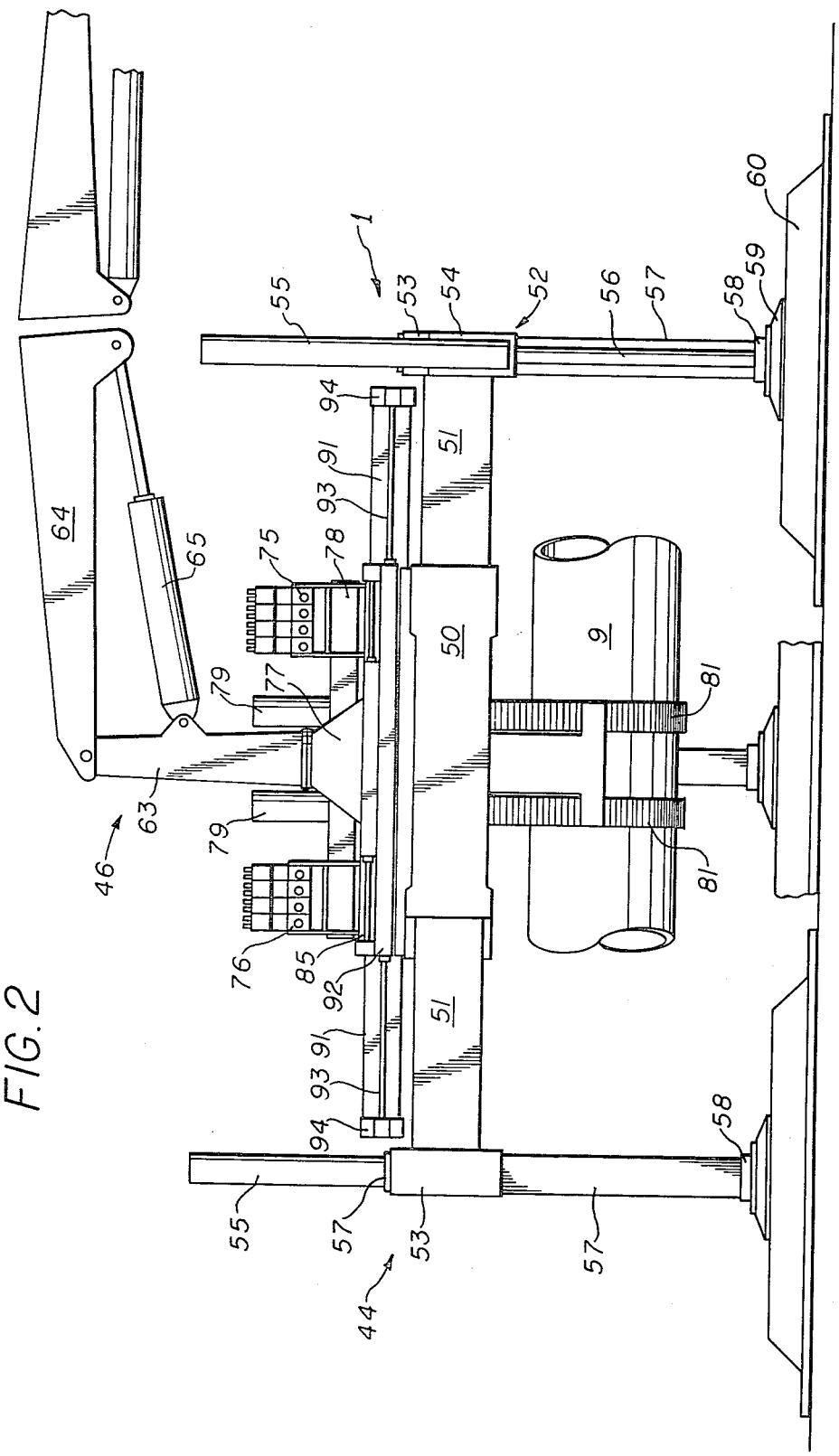
FIGS. 2, 3, 4, 5, and 6 are front, port side, plan, longitudinal section, and lateral section views, respectively, of a preferred embodiment of the invention.
Figure 3:
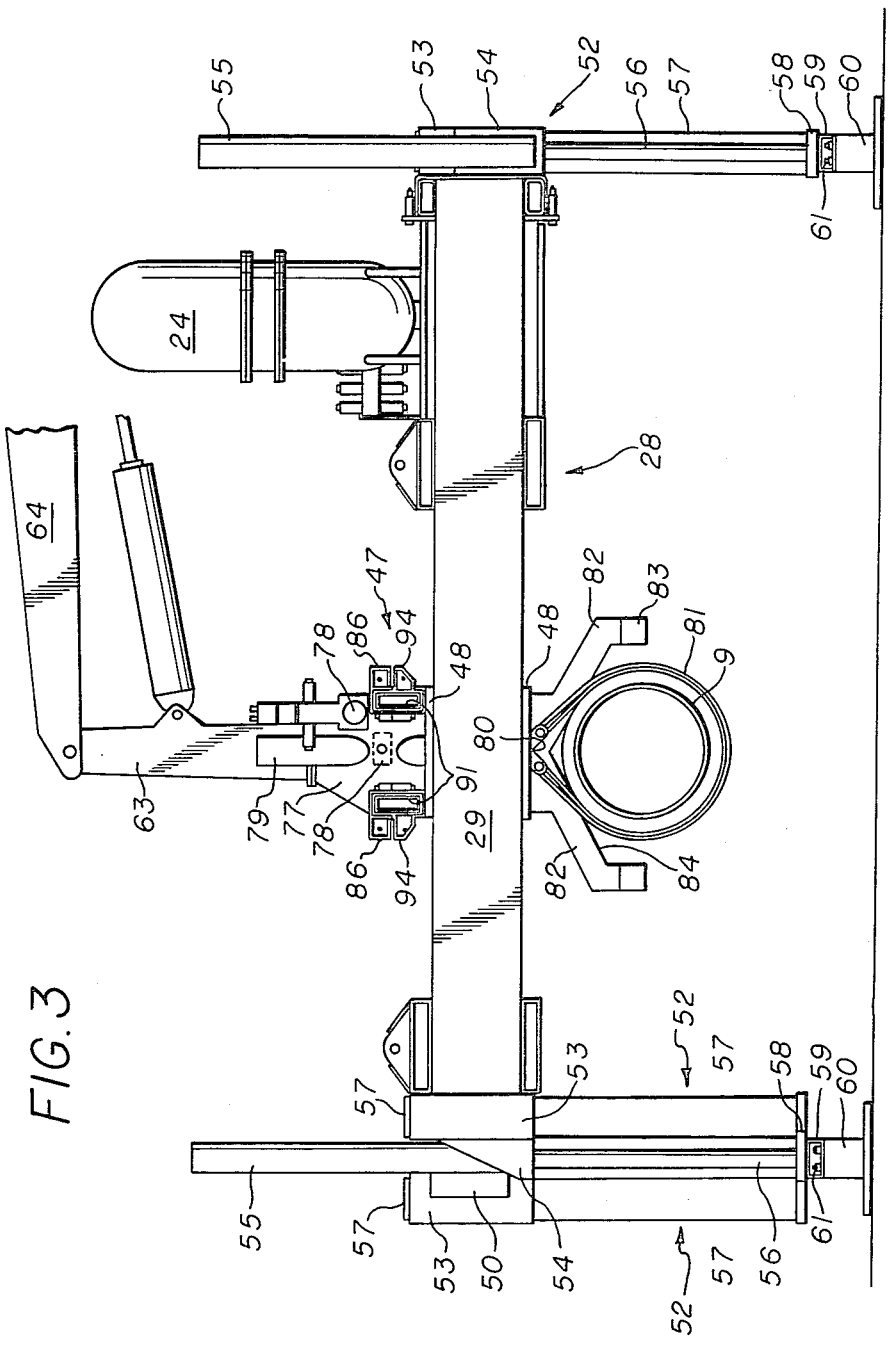
Figure 4:
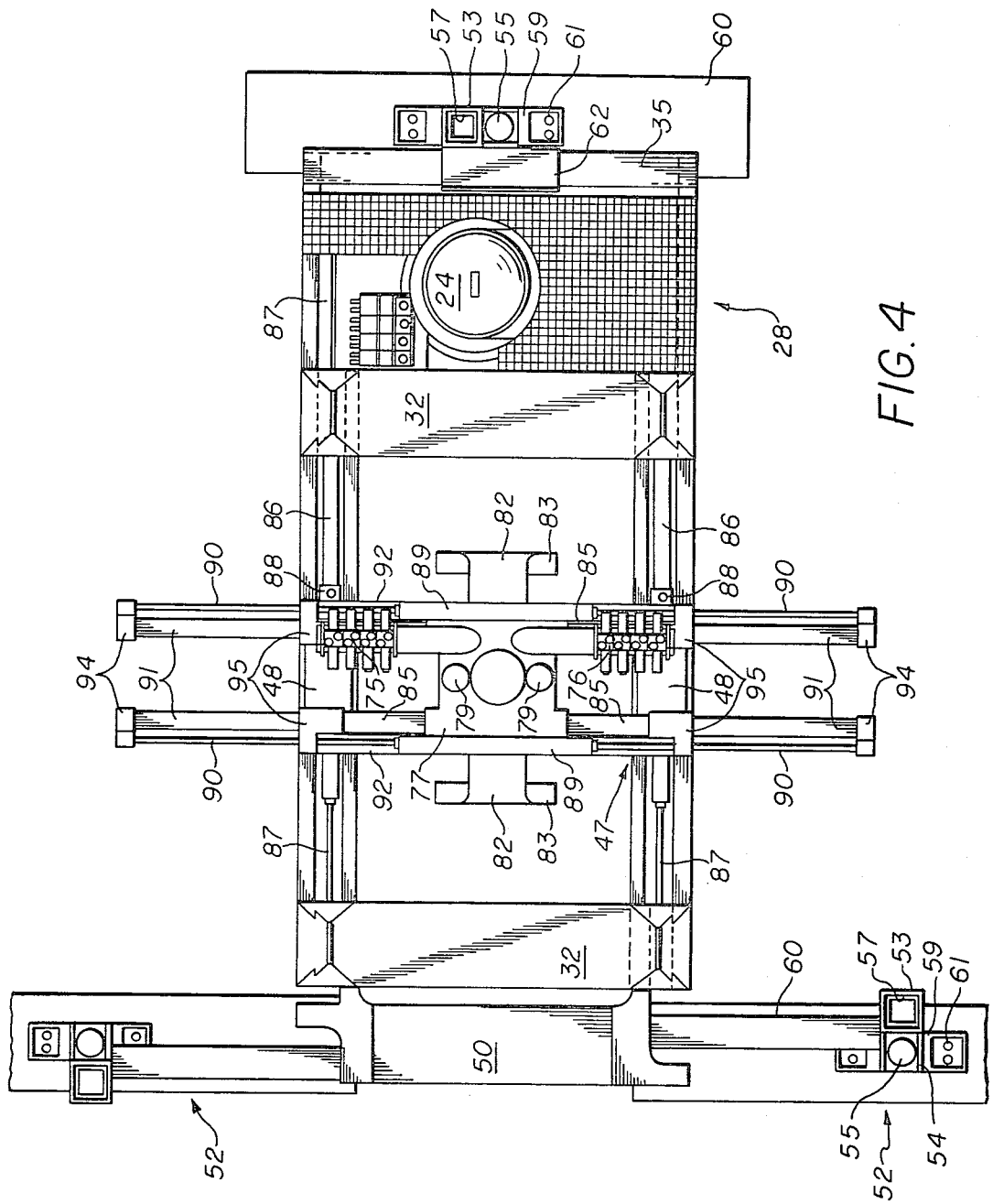
Figure 5:
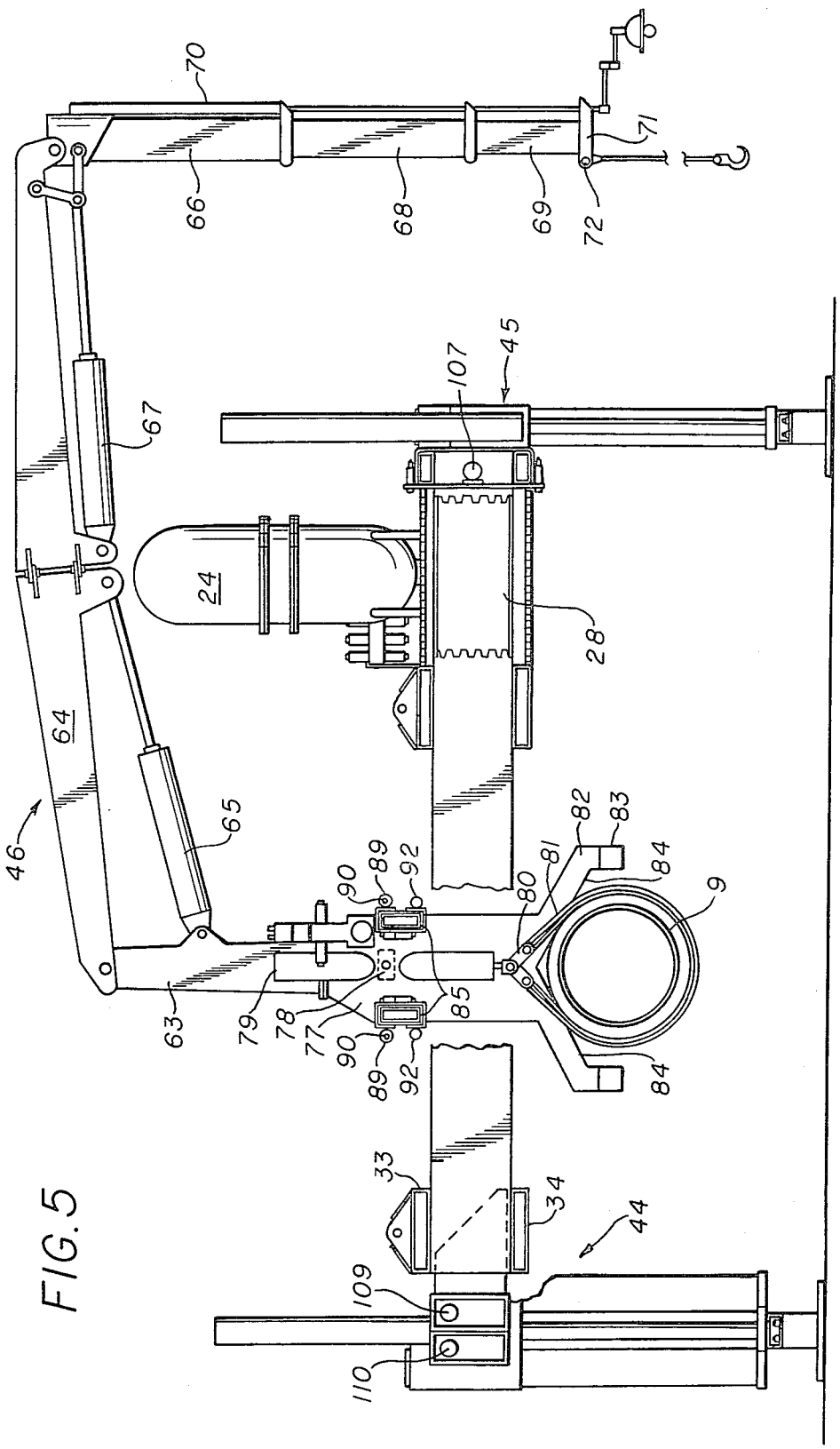

FIG. 1 shows cranes 1 and 2 at a subsea work site adjacent to a deepwater platform 3 having risers 4, 5, and 6 proceeding down proximate the sea floor. Risers 4 and 5 have been connected to pipelines. Riser 6 is of greater interest, having elbow 7 with flange 8 awaiting connection to spool piece 9 having segments 10, 11, and 12, elbows 13 and 14, and flanges 15 and 16 for mating flanges 8 and 17, respectively. Flange 17 is on a pipeline end 18 which rests on sandbags 19, holding flange 17 up for connection to flange 16.

Spool piece 9 is supported according to the invention by cranes 1 and 2, viewed from abaft the port, in approximately parallel but separated array. Cranes 1 and 2 are moving piece 9 into position for the said connections, under control of diver 20 holding controller 21 on controller cable 22 which leads to control unit 23 mounted on power unit 24, which is mounted on crane 1.

Crane 2 has no such power and control unit thereon. Crane 2 is powered and controlled by power and control units 23 and 24, through slave control cable 25, which carries control signals and hydraulic power supply and return to slave crane 2. Slave crane 2 is otherwise like master crane 1, except for two demountable optional accessories, being clamp 26 and footing 27. It is even like it to the extent that all connectors are present to receive power and control unit 23-24 thereon, or another such power and control unit. Such receipt would make crane 2 a master crane, such as crane 1 is shown to be.

Crane 1 comprises a horizonta; frame 29, see Frame 2, comprising fore-and-aft runways 29 of inner tubes 30 and outer tubes 31 held together and spaced apart by thwarts 32 comprising tubes 33 and 34, and terminating in after thwart 35 comprising flange tubes 36 and 37 welded with welds 38 to web plate 39 forming a channel-like beam similar to a plate girder, here to be called a tube girder.

Frame 28 additionally comprises grating struction 40 and lifting lugs 41 for lowering crane 1 to the sea floor and other accessories 50 including lights known in the art. Frame 28 is a rectangularly welded structure, with its major components held together by structural seal welds 42 running fully around each intersection of its component runway and thwart tubes, providing a spare, clean structure well adapted to corrosion-resistant coating, preferably comprising zinc and epoxy. Longitudinal tubes 31 can by cover-plated to form a novel corrosion-resistant width frame. The frame 29 is of truck bed width convenient shipping length, and is suitable to receive the modular systems of appurtenances being disclosed herein.

Forward outrigger structure 44, after leg structure 45, upper works 46, and bridge works 47 with trucks 48, all demountably mount frame 28 to comprise the versatile crane 1.

Now FIGS. 2 through 6 can be read together for better understanding of crane 1 and appurtenances. Forward outrigger structure 44 comprises receiving structure 50 movably receiving telescoping outriggers 51 having leg structure 52 at the ends thereof. Legs 52 comprise sleeves 53 with brackets 54 holding hydraulic rams with rods 56 driving leg tubes 57 by means of base plates 58 mounted articulately onto wobble tubes 59 on footings 60. Wobble tubes 59 are loosely bolted to 60 with bolts 61, and are concentric with rods 56, yielding advantages of centricity of load and reaction. Such advantageous centricity is not obtained in crane outriggers of the prior art wherein the footing is centered on the guide tube rather than on the ram. Such eccentricity causes bending in the guide tube and the ram, a disadvantage overcome by the present sloppiness in the wobble tubes and centricity of footing and ram.

After leg structure 45 comprises another leg 52 with slider 62 riding after thwart 35 as will be shown in detail.

Upper rotary crane boom works 46 comprises revolving post 63 supporting boom 64 with boom lift ram 65 and jib 66 with jib lift ram 67 and housing sliding telescoping jibs 68 and 69 actuated by telescope ram apparatus 70, all for operating lift pin means 71 having pin 72, all shown in FIG. 1, supporting choker 73 around spool piece 9, with light 50 for convenience. Ram means 65, 67, and 70 are auxiliary hydraulic outlet 74 are all served by solenoid valve bank 75 by means well-known in the art.

Valve bank 76 similarly serves bridge apparatus 47 comprising sliding trolley 77 housing hydraulic rotary actuator 78 for rotation of upper works 46 about the vertical axis. Trolley 77 houses gimbals 78 supporting demountable pipe lift rams 79 supporting sling buckles 80 holding slings 81 around spool piece 9. Trolley 77 also receives and holds demountable bow legs 82 with feet 83 and pipe alignment guide surfaces 84.

Trolley 77 rides bridge beam tubes 85 housed in clamps 95 mounted on trucks 48 riding runways 29, driven by double-ended runway rams 86 having rods 87 anchored to frame 28, with rams 86 in gimbals 88 mounted onto trucks 48. Trolley 77 is driven by double-ended trolley rams 89 having rods 90 anchored to clamps 86. Not shown in FIG. 1, for clarity, but shown in FIGS. 2–6, are demountable base boom tubes 91 driven by double-ended rams 92 having rods 93 anchored to fittings 94 on tubes 91. Actuation of rams 92 will cause motion of tubes 91 through and relative to bridge beam tubes 85, which have interior bearing surfaces to suit tubes 91. Actuation of rams 89 will cause motion of trolley 77 along tubes 85. Trolley 77 has interior bearing surfaces to suit tubes 85. Actuation of rams 86 will cause motion of all of means 47 along the runways 29. Thus trolley 77 can be positioned over a considerable area of the ground, after the fashion of trolleys on bridge cranes. Rams 79, 86, 89, and 92 are served by valve bank 76.

Figure 6:
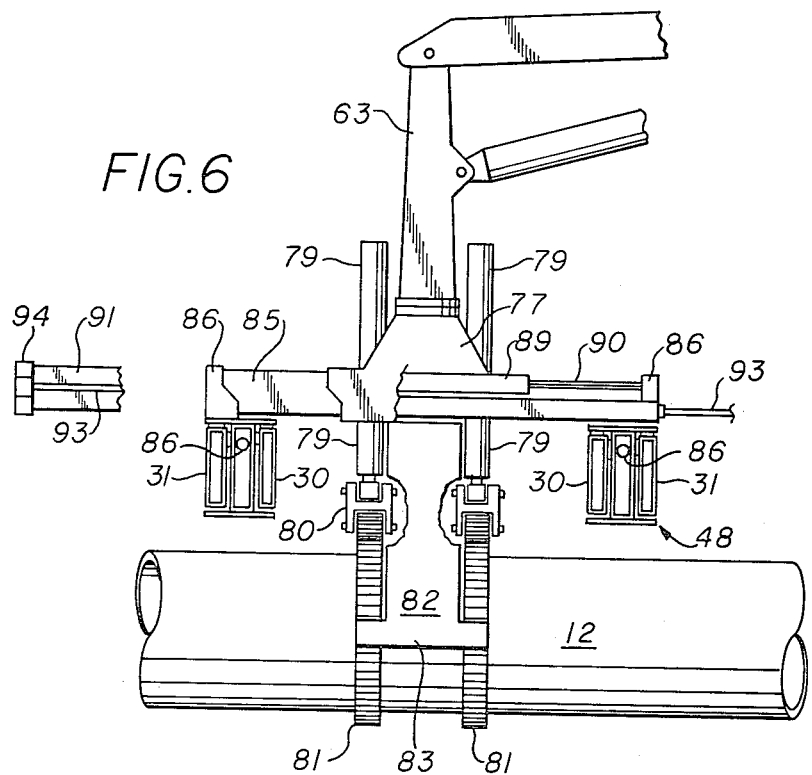
Figure 7:
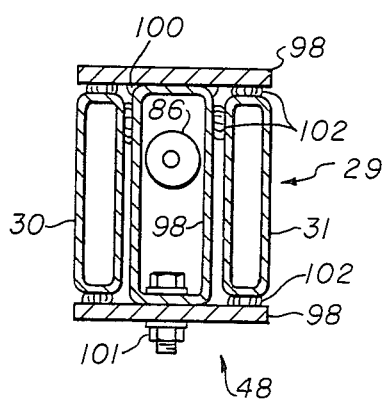
FIGS. 7 and 8 are detailed sections of the runway/truck assembly and the powered after leg slider, respectively.

FIGS. 6 and 7 show trucks 48 in some detail. Trucks 48 comprise a novel sort of I-beam, comprising flange plates 98 and web tube 99 together by continuous seal weld 100 and bolts 101 with important advantages to be claimed. The term I-beam is out of the art, but it will be seen to be more appropriate to call it after the Roman numeral II, which will be used hereafter to describe a doubly cover-plated tube. Rams 86 are shown in position, passing through tube 99. Plastic bearing material 102 provides guiding and allows easy sliding of trucks 48 along runways 29.

Figure 8:
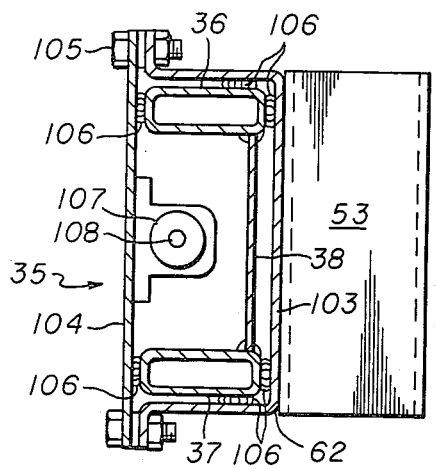

FIG. 8 shows slider 62 and thwart 35 in similar detail. Thwart 35 comprises flange tubes 36 and 37 with web plate 38 welded between to form a channel-like section with hollow flanges. Such a section has advantages under water, as will be shown. Slider 62 comprising hat plate 103 with back plate 104 bolted together with bolts 105 has bearing strips 106 for sliding on thwart 35. Ram 107 with rods 108 (See FIG. 1.) anchored to frame 28 can thus position leg 45 anywhere along the middle of thwart 35.

The tubes discussed are mill-welded, rectangular, structural tubes. The advantages of the tube girder used in orthogonal conjunction with the tube II beam or with tube beams include the provision of a torque-resistant orthogonal framework having no shop welds in interior locations, and the lapped arrangement leaves tube interiors accessible to sandblast nozzles and inspection probes. No means is known in the prior art to provide efficient economical and reliably corrosion-proofed torque-resistant orthogonal frames.

Outrigger assembly 44 has rams 109 and 110 therein for moving forward legs 52 in and out with respect to frame 29, simultaneously or sequentially.

Further detail is unnecessary, as such means will be understood by those skilled in the art.

What is not familiar from prior art is the mode of operation made possible by simultaneous operation of rams 107, 109, and 110. If crane 1 is supported on legs 52, and if, by way of example, slider 62 is fully to port, the port leg sits fully extended and the starboard leg sits fully retracted, the powered reaction of the port leg, simultaneous powered lateral motion of the after leg and powered extension of the starboard leg will move the entire frame 28 and all structure supported thereon to port as a unit. If, at about the same time, trolley 77 is powered to port, the sum of the frame motion and the trolley motion will be imparted to any pipe which might be supported by the booms and/or slings. Such motion is valuable for motion of the pipe, along with other loads.

Returning to crane 2, it is distinguished as follows. Footing 27 is a field-fabricated saw-horse or portal frame for supporting the rear leg 28 above piece 11, allowing for said parallel arrangement of cranes 1 and 2. Clamp 26 is a powered hydraulic pipe tongs, such as known in the art, suspended from crane 2, shown for variety.

Such capability for carrying the pipe laterally also allows for "walking" of the crane according to methods which will be clear after the immediately following disclosure (which actually relates to walking without actuation of rams 107, 109 on 110, but actuation of which would make for longer steps a beam) of FIGS. 9 through 20. The odd-numbered Figs. thereof are front views of crane 1 supporting or supported by spool piece 111 having flange 112 to be brought to connect to flange 113 on pipeline end 114. The even-numbered Figs. show the port side view for each of its immediate predecessors.

Figure 9:
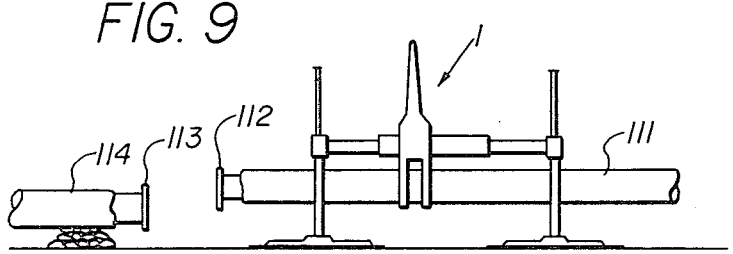
Figure 10:
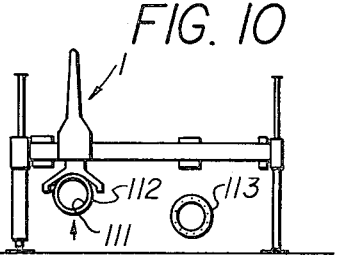
Figure 11:
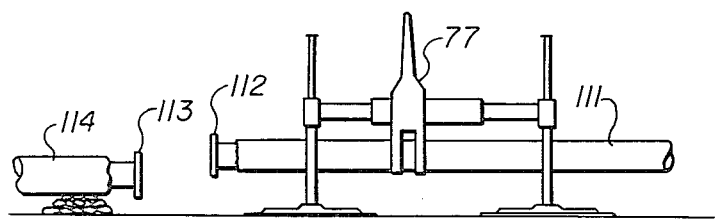
Figure 12:
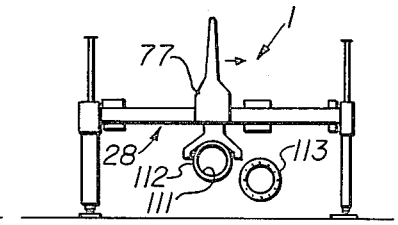
Figure 13:
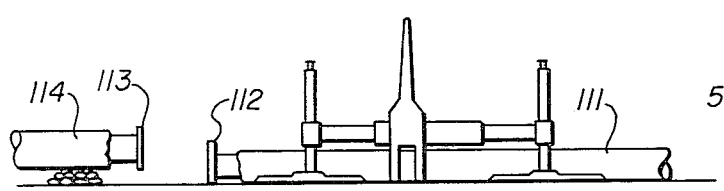
Figure 14:
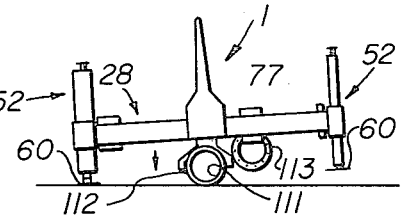

In FIGS. 9 and 10, crane 1 holds spool 111 up, but too far away from 113 to connect. In FIGS. 10 and 11, piece 111 is moved afterwards, laterally closer to alignment with 113. In FIGS. 13 and 14, leg means 52 are raised partly disengaging footings 60, bringing crane 1 to rest mostly on piece 111, which engages the sea bed. The weight of and position of crane 1 cause it to tilt.

Figure 15:
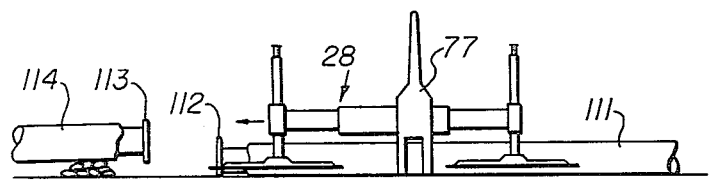
Figure 16:
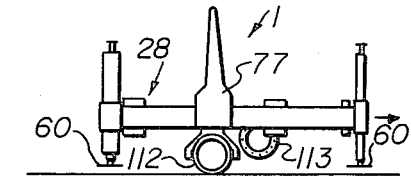

In FIGS. 15 and 16, trolley 77 is moved relative to frame 28 to further disengage footings 60, then is moved again relative thereto to carry frame 28 closer to frame 113.

Figure 17:
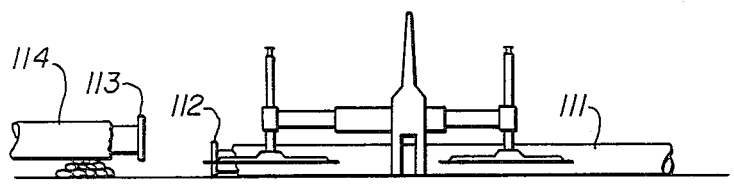
Figure 18:
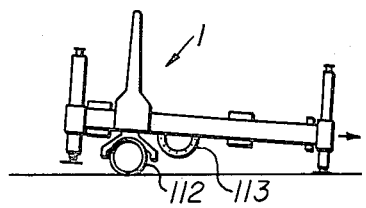

In FIGS. 17 and 18, further movement of 77 relative to 28 brings frame 28 into better position, and tilted.

In FIGS. 19 and 20, actuation of legs 52 drives footings 60 into full engagement with the sea bed, and lifts piece 111, then trolley 77 is moved towards flange 113, completing a step.

FIGS. 19 and 20 are analagous to FIGS. 9 and 10, except that flanges 112 and 113 have been brought nearly together. Only one more such step will be required to bring them fully together.

The Figs. do not show the other end of the spool piece 111, which was held up by crane 2, operated in parallel with crane 1. In other cases, means 46 could hold up the other end, or boom 91. The procedure shown is for the largest pieces.

Alternatively, longer steps could be taken by longer motion of piece 111 by either or both of booms 91 and the set of rams 107, 109, and 110.

Also, alternatively, footing 60 could be fitted with wheel means for further and faster motion. Such wheels would be appropriate to more general construction than the tie-in being shown.

FIG. 21 is a lateral section view through crane 1 looking forward showing crane 1 supporting demountable concrete removal accessory 115 comprising boom accessory 116 with rigid attachment 117 to end 72 and with track 118 carrying slider 119 with clamp 129 to selectively set slider 119 where desired on 118. FIGS. 22, 23, and 24 show further detail thereof in section views. Slider 119 carries housing 120 housing oscillating crescent 121 driven back and forth by friction wheel 122 on axle 123 driven by hydraulic motor 124 connected by hoses 175 to outlets 74 on crane 1. Crescent 121 carries releasable nozzle clamps 126 holding nozzles 127 on hoses 128, which go to the deck of an attending vessel, where there is a high pressure pump, pumping blasting fluid (preferably water) through hoses and nozzles 127 to remove concrete 129. In the system shown, the diver 20 manually positions the slider 119 on track 118 and clamps it with clamp 132 as desired, then operates controller 21 to oscillate crescent 121 to blast away the concrete 129 on pipeline end 130 supported by crane 1 for access and positioning. However, it will be clear to those skilled in the art that such positioning and oscillation could be automated by well-known means, in case the volume of work justified it.

It will also be clear that means 116 could be omitted, and that crescent housing 120 could be supported directly by means 72 and positioned by upper works 46, in case of lower volumes of work not justifying the expense of means 116.

The term Hydrocouple, although it is a brand name, should be understood here to mean any pipeline connection fitting of the art, including such connectors as Comectors (brand name) and other means. A Hydrocouple is a pipeline repair fitting of the prior art which is meant to be slid onto a pipe and clamped and sealed (set) thereto. The Hydrocouple being shown is hydraulically set; a similar use of crane 1 could be used for mechanically set connectors.

Figure 25:
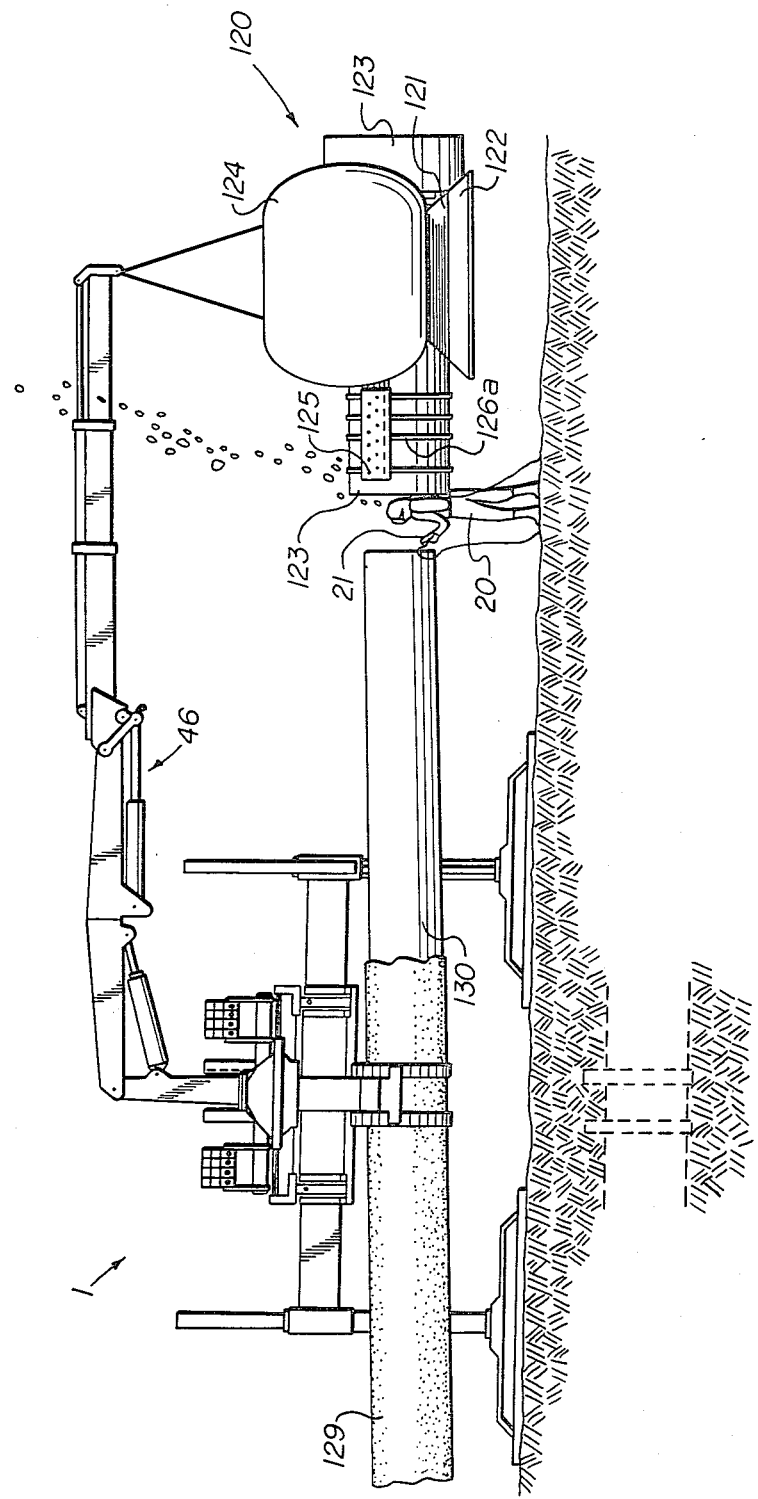
FIG. 25 is a general section view through the crane at work placing a Hydrocouple using manifold and buoyancy according to the invention.

FIG. 25 shows a next possible step in sequence after that of FIG. 21. Crane 1 supports pipe end 130 with enough concrete 129 removed to allow placement of a Hydrocouple half. Upper works 46, through pin 72, supports a Hydrocouple skid and manifold unit 120 (shown in end view in FIG. 27). Unit 120 comprises mountings 121 on skid 122, supporting Hydrocouple 123 and buoyancy tanks 124. Mountings 121 bear manifold 125, which collects hydraulic lines 126a to a convenient height for diver 20 to plug hoses 126b as needed, later.

But, in FIG. 25, diver 20 uses controller 21 to operate works 46 to bring Hydrocouple unit 120 into alignment with pipe 130, and then to operate rams 70 to telescope 68 and 69 so as to slide the Hydrocouple 123 onto the prepared pipe 130. Tanks 124 are filled with sufficient air so that the buoyant weight of unit 120 with Hydrocouple is very small, but not so small as to be unstable. Thus, diver 20 can safely use his sense of touch to adjust the position of unit 120, either by hand or by machine. Visibility is often very poor. The variable speed means 21 will be valuable in placing the Hydrocouple, as will the controlled reversible motion of means 68/69. In the prior art, winch cables operated from the surface and rove through submarine blocks are sometimes used. Such means imparts vessel motions to the sea floor equipment. The present invention overcomes the irreversibility and dangerously poor control of the prior art.

FIG. 26 shows another aspect of PRIOR ART. In the prior art, the diver must get into very awkward positions to connect hoses 126b to the Hydrocouple, which is not conveniently designed for access. In the improved skid unit 120 of FIGS. 25 and 27, no such time-consuming and difficult reaching is necessary.

FIG. 28 shows the associated deck unit 127 of this invention. Unit 127 comprises skid 128, hose reel 129 for hoses 126, pump and gauge unit 130, and tool and accessory box 131. The technician can feed an appropriate length of cable to the diver, be confident that the diver has set all hoses 126b properly because of the manifold, and set the Hydrocouple.

Later Figures will further illuminate the above.

The sequence of steps of FIGS. 29–33 will illustrate a complete midline connection by method of this invention. The work will be done off of the deck of a dive ship of the prior art.

FIG. 29 illustrates the steps of
 a. placement of cranes 1 and 2 over unconnected pipeline ends 133a and 133b having weight-coat 134a and 134b,
 b. placement of units 120a and 120b conveniently near ends 133 and connection of tanks to air hoses 135 from the surface for filling with compressed air to lighten units 120,
 c. picking up pipe ends 133 by means of cranes 1 and 2,
 d. operation of concrete removal means 115, shown used without means 116, to remove concrete 134,
 e. preparation, as by cutting, of pipe ends 133 to receive Hydrocouples, FIG. 30 shows the next step of picking up and placing coupling halves as in FIG. 25, using cranes 1 and 2 for 120a and 120b, respectively.

The foregoing steps of FIGS. 29 and 30 are general initial steps, suitable to initiate three different procedures to be illustrated with variation.

Figure 31:
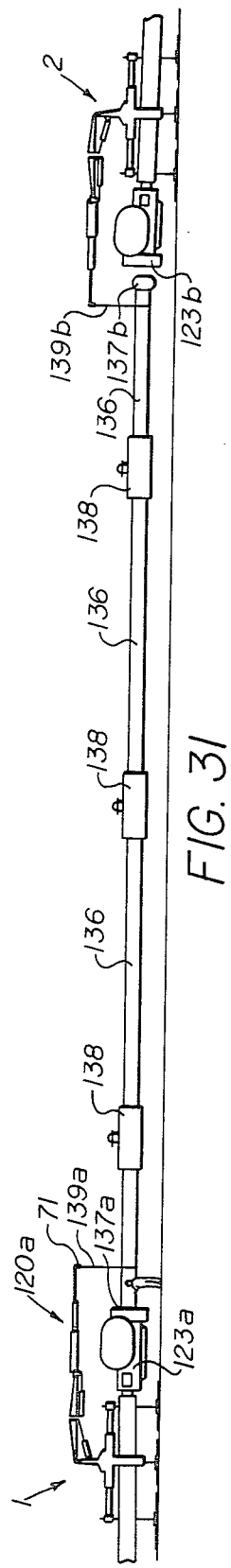
FIGS. 31, 32, and 33 show steps of a first procedure, suitable for following the steps before.
Figure 32:
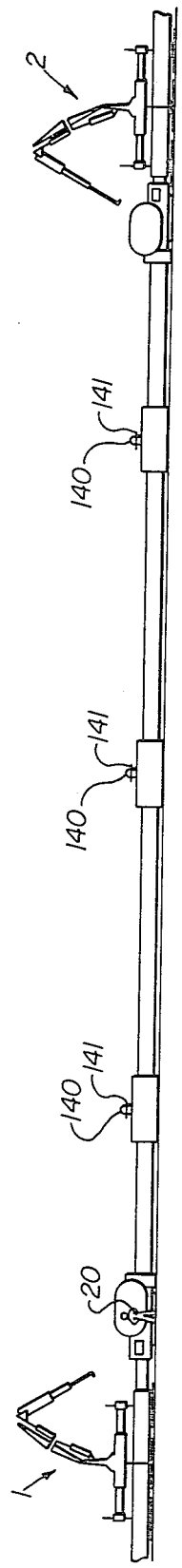
Figure 33:
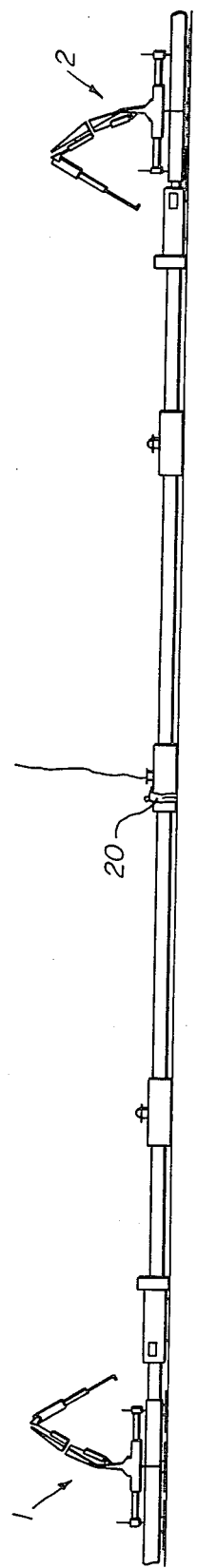

FIGS. 31, 32 and 33 show steps following the preceeding.

In FIG. 31, a spool piece 136 having Hydroballs 137 and buoy ballast tanks 138 has been placed on the bottom, and so have cranes 1 and 2 using chokers 139a and 139b, tanks 138 cylindrical tanks filled with air sufficient to nearly float piece 136, the left ball 137a has been maneuvered into Hydrocouple 123a, so that Hydrocouple 123a houses ball 137a, supporting 136.

These steps follow in FIG. 32.
 a. choker 139a is released and attached to unit 120a, and boom means 71 pushes spool piece 136 and 120a, in co-operation of the boom of crane 2, rightwards as a unit, guiding ball 137b into Hydrocouple 123b,
 b. chokers 139 are released, and whole assembly is lowered to rest on sea bed,
 c. tanks 138 are flooded by operation of valves 140 on flanges 141,
 d. tanks 124a and 124b are flooded and removed to the surface vessel.

Next, in FIG. 33,
 a. flanges 141 are removed from tanks 138,
 b. ballast, (sand or concrete) is placed in tanks 138,
 c. Hydrocouples are set by the means of FIGS. 27 and 28,
 d. all equipment except ballast tanks 138 and skids 122 are released and removed to the vessel, which departs.

The above procedure could be modified to suit varying conditions in ways which will be clear to those skilled in the art. For example, novel tanks 138 could be replaced by lifting balloons and their ballast fittings of the prior art, in case tanks 138 were not available. Other connectors could be used, including submarine welding, in variations on the procedure.

The next procedure, that of FIGS. 34, 35 and 36, a mid-line tie-in using bias-cut Hydrocouples, will now be explained. Prior to FIG. 34, steps analogous to those of FIGS. 29 and 30 were executed, except that bias-cut Hydrocouple halves 142 were placed using buoyancy assistance as needed, and using cranes 1 and 2 approximately as before.

Figure 34:
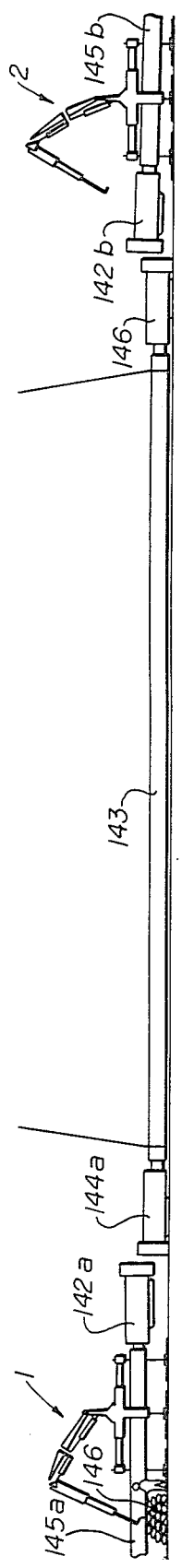
FIGS. 34, 35, and 36 show different (second) procedure suitable for following such steps as those of FIGS. 23 and 24.
Figure 35:
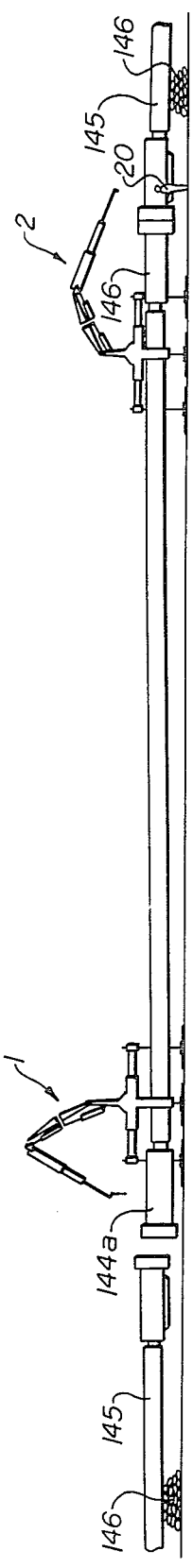

In FIG. 34,
 a. weight-coated spool piece 143, having bias-cut Hydrocouple halves 144 bound concentrically in place thereon, is lowered to the marine floor,
 b. cranes 1 and 2 walk and move pipeline ends 145a and 145b into approximate alignment with 143, then using upper works, place sandbags 146 under ends 145 and lower ends 145 thereonto, with end 145 supported accessibly above the marine floor, In FIG. 35,
 a. cranes 1 and 2 are released from ends 145,
 b. cranes are moved onto spool piece 143, and operated to lift piece 143 with connectors 144 into good alignment with ends 145,
 c. boom of cranes 1 is used to move Hydrocouple halves 142a and 144a together, and likewise crane 2 moves 142b and 144b together.

Figure 36:
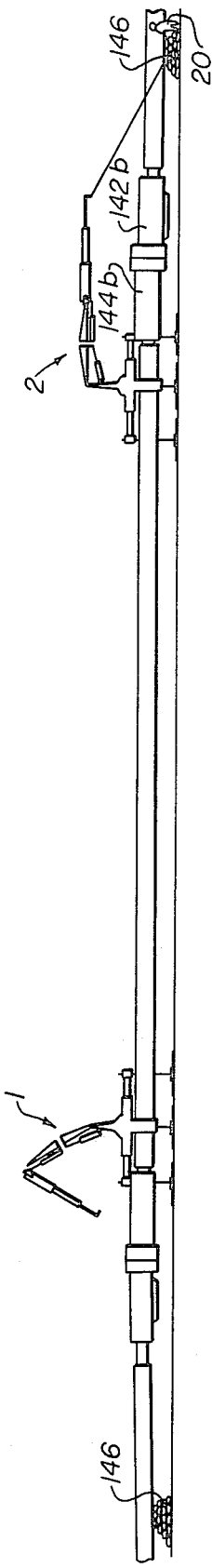

In FIG. 36, next,
 a. booms remove sandbags by pulling,
 b. diver connects Hydrocouples to deck unit 127,
 c. whole is lowered to sea floor,
 d. hydrocouples are set by deck unit 127, operated by technician,
 e. cranes are released and removed, with connection complete.

The sequence of FIGS. 37, 38 and 39 was preceeded by just such a sequence as in FIGS. 29 and 30 to place Hydroball type Hydrocouples, so foregoing steps will not be re-explained.

In FIG. 37, we find pipeline ends 147a and 147b supported by cranes 1 and 2, having placed units 148a and 148b identical to units 120 on ends 147.
 a. weight-coated spool piece 148 with pillows 149 bound thereto, and with Hydroballs 150a and 150b welded on, is lowered to the sea floor between coupling units 148, with the assembly supported above the sea floor by pillows 149, which are simple cradle-like structures for the purpose. Greater flexibility can be obtained by placing rollers in the pillows for axial or rolling motion of the pipe, but this simpler means is shown here,
 b. booms 149 slide spool piece along pillows as necessary.

In FIG. 38,
 a. cranes 1 and 2 operate to align ends 147 with piece 148,
 b. upper works of cranes 1 and 2 operate to slide Hydrocouple units 148 onto balls 150,
 c. in FIG. 39, cranes lift whole off of pillows (not imperative, pillows can be left), pillows are removed, tanks of 148 are removed,
 d. whose is settled onto sea floor by operation of cranes 1 and 2, and e. Hydrocouples are set, as before, cranes are removed to depart, leaving the connection complete.

FIG. 40 is a cross-section through crane 1 at work on another type of work. Crane 1 supports pipeline end 154 and novel habitate 155 for welding end 154 onto end 156, which is supported by means in alignment with 154. Diver 20 is inside open-bottomed habitat 155 welding ends 154 and 156 together. Diver 20 is in air 157 contained by habitat 155, illustrated by water-air interface 158. Diver 20 previously introduced air 157 from the surface through hoses into habitat 155 after sealing 155 to 154 and 156 by means of gates 159 and seals 160, for which see FIG. 41, an end view of 155, supported by cable 161. Gates 159 swing on hinges 162 and have elastomeric seals 160 around themselves and opening 163 of size suitable to the pipe. Habitat 155 is made of plate to suit the job, and, because it is small, just big enough for the diver, no great pressures are involved.

Crane 1 is ideally suited to handle such a habitat, which will provide fully as good a result as the multimillion dollar integral habitat and alignment frames now in use.

FIG. 42 shows, in perspective, a detail of an advanced embodiment of tubular framing of the invention web tube 165 and flange tubes 166 form a tube II beam such as was discussed earlier. Flange tubes and web plate 168 form a hollow-flanged channel-like beam similar to thwart 35. Consideration will show that continuous structural seal weld 169 everywhere makes an accessible continuous fillet, that the intersections everywhere are strong, that the interior of every tube is accessible from the end thereof, and that a frame is obtained such as is not found in the prior art. The tubes considered are welded in a mill with automatic equipment producing highly reliable welds with close tolerances, yielding, along with the intersection shown, a highly reliable and advantageous novel structure, being tursionally strong, light, and corrosion-resistant.

The invention claimed is:

1. A submarine concrete removal tool comprising a crescent carrying two coaxially opposed concrete removal jets and track means for said crescent for transporting said jets along pipe wherein said track means comprises a pipe lift means coaxial therewith for lifting and holding pipe above the sea floor.

2. A submarine concrete removal tool comprising a member carrying two coaxially opposed concrete removal jets and track means for said member for transporting said jets along pipe wherein said track means comprises a pipe lift means coaxial therewith for lifting and holding pipe above the sea floor.

* * * * *